(12) United States Patent
Pavloff et al.

(10) Patent No.: US 11,681,834 B2
(45) Date of Patent: Jun. 20, 2023

(54) TEST CELL PRESENCE SYSTEM AND METHODS OF VISUALIZING A TEST ENVIRONMENT

(71) Applicant: Augmntr, Inc., Nevada City, CA (US)

(72) Inventors: Alexander George Pavloff, Grass Valley, CA (US); Bryan Lafayette Redd, Grass Valley, CA (US)

(73) Assignee: Augmntr, Inc., Nevada City, CA (US)

( * ) Notice: Subject to any disclaimer, the term of this patent is extended or adjusted under 35 U.S.C. 154(b) by 245 days.

(21) Appl. No.: 16/777,805

(22) Filed: Jan. 30, 2020

(65) Prior Publication Data
US 2020/0358833 A1 Nov. 12, 2020

Related U.S. Application Data

(60) Provisional application No. 62/798,951, filed on Jan. 30, 2019.

(51) Int. Cl.
| | |
|---|---|
| *G06F 30/12* | (2020.01) |
| *G06T 7/80* | (2017.01) |
| *G06T 17/00* | (2006.01) |
| *G06F 30/20* | (2020.01) |
| *G06T 3/40* | (2006.01) |
| *G06T 19/00* | (2011.01) |
| *H04L 65/61* | (2022.01) |
| *H04L 65/65* | (2022.01) |

(52) U.S. Cl.
CPC .............. *G06F 30/12* (2020.01); *G06F 30/20* (2020.01); *G06T 3/4084* (2013.01); *G06T 7/80* (2017.01); *G06T 17/00* (2013.01); *G06T 19/006* (2013.01); *H04L 65/61* (2022.05); *H04L 65/65* (2022.05)

(58) Field of Classification Search
None
See application file for complete search history.

(56) References Cited

U.S. PATENT DOCUMENTS

| | | | |
|---|---|---|---|
| 9,286,712 B2 | 3/2016 | Kontkanen | |
| 10,497,177 B1 | 12/2019 | Cote et al. | |
| 2008/0310707 A1 | 12/2008 | Kansal et al. | |
| 2009/0273601 A1 | 11/2009 | Kim | |
| 2009/0293012 A1 | 11/2009 | Alter et al. | |
| 2010/0315416 A1* | 12/2010 | Pretlove | G06T 7/001 345/419 |
| 2011/0148866 A1 | 6/2011 | Chu et al. | |
| 2011/0169832 A1* | 7/2011 | Brown | G06F 3/0346 345/427 |

(Continued)

OTHER PUBLICATIONS

Hugues Hoppe; "Smooth View-Dependent Level-of-Detail Control and its Application to Terrain Rendering;" IEEE, Proceedings of Visualization '98 (Cat. No. 98CB36276), 9 pages; 1998 (Year: 1998).

*Primary Examiner* — Cai Y Chen
(74) *Attorney, Agent, or Firm* — Fox Rothschild LLP; Kari L. Barnes

(57) ABSTRACT

Exemplary embodiments described herein include methods of systems for visualization of test cell environments. Exemplary embodiments may include a test cell presence system and method of providing test cell visualization that displays and permits virtual interaction with complex, three-dimensional (3-D) data sets. Exemplary embodiments permit visualization through digital reality, such as Virtual Reality (VR), Augmented Reality (AR), and other display solutions.

15 Claims, 7 Drawing Sheets

(56) References Cited

U.S. PATENT DOCUMENTS

| | | |
|---|---|---|
| 2012/0092328 A1 | 4/2012 | Flaks et al. |
| 2012/0169832 A1* | 7/2012 | Morishita .............. H04N 7/141 |
| | | 348/14.08 |
| 2012/0264510 A1 | 10/2012 | Wigdor et al. |
| 2012/0274633 A1 | 11/2012 | Ivanov et al. |
| 2013/0131978 A1 | 5/2013 | Han et al. |
| 2015/0206343 A1 | 7/2015 | Mattila et al. |
| 2015/0287244 A1 | 10/2015 | Watanabe et al. |
| 2017/0236305 A1* | 8/2017 | Staudenmaier ......... G06T 7/521 |
| | | 348/148 |
| 2017/0278304 A1 | 9/2017 | Hildreth et al. |
| 2018/0089899 A1 | 3/2018 | Piemonte et al. |
| 2018/0228553 A1 | 8/2018 | Bai et al. |
| 2018/0350134 A1 | 12/2018 | Lodato et al. |
| 2019/0266796 A1 | 8/2019 | Comer |
| 2020/0035020 A1 | 1/2020 | Price et al. |
| 2020/0053347 A1 | 2/2020 | Marchak, Jr. et al. |
| 2020/0099891 A1 | 3/2020 | Valli et al. |
| 2021/0383115 A1 | 12/2021 | Mon et al. |
| 2021/0398316 A1 | 12/2021 | Panse et al. |

\* cited by examiner

TEST CELL PRESENCE SYSTEM AND METHODS OF VISUALIZING A TEST ENVIRONMENT

PRIORITY

This application claims priority to U.S. Provisional Patent Application No. 62/798,951, filed Jan. 30, 2019, which is incorporated by reference herein in its entirety.

GOVERNMENT LICENSE RIGHTS

This invention was made with government support under Contract No. FA9101-18-P-0019 awarded by the Air Force. The government has certain rights in the invention.

BACKGROUND

Performance testing of specialized, frequently unique, test articles may be desired in different environments, often operating under strenuous environmental conditions. Conventionally, a number of cameras and sensor are provided to observe the test object and relay individual and different data back to the user. The user may be presented with individual data feeds or information regarding the test object. Information or alarms may be set on based on the individual sensor to draw attention to a critical condition. However, the information is presented in isolation without a comprehensive correlation to the test object or environment being observed.

A simple "lots of cameras with a really fast network" solution will not suffice to cover the entire test cell area while simultaneously delivering uncompressed video feeds with the desired resolution. To achieve the desired resolution a large number of cameras would be required that would overload practical system bandwidth limitations.

For a test environment having a complicated test object or test environment, there does not exist a comprehensive way to compile the information or provide a method for providing and displaying the information to a user in a comprehensive manner.

BRIEF SUMMARY

Exemplary embodiments of the monitoring system described herein may provide comprehensive, three-dimensional (3D) test cell visualization. Exemplary embodiments described herein include a virtual test cell presence system.

Exemplary embodiments may include a test cell presence system and method of providing test cell visualization that displays and permits virtual interaction with complex, three-dimensional (3-D) data sets. Exemplary embodiments permit visualization through Virtual Reality (VR) and Augmented Reality (AR) solutions while preserving precise temporal and spatial registration. Although display options are described herein in terms of AR/VR, other display options are also included herein, including, without limitation, flat screen approximations of the three dimensional rendering viewable on a flat screen or in augmented or virtual reality.

Exemplary embodiments may include devices for receiving data including, for example, ruggedized imaging systems, temperature sensing, optical imaging in various wavelengths, electrical sensor, mechanical sensors, other data sources, and combinations thereof. Exemplary embodiments described herein may be hardware-agnostic and not tied to a specific VR or AR product and/or brand, allowing the customer to leverage appropriate VR/AR technology evolutions as they materialize.

Exemplary embodiments include a system of receiving data about a test object. Exemplary embodiments are configured to superimpose the received data onto a three dimensional virtual object, where the three dimensional virtual object is a representation of the physical test object. In an exemplary embodiment, the system is configured to receive information regarding the physical test object. The system components may be positioned in a known location and orientation relative to the physical test object such that data received from the system components may be overlayed onto the virtual representation of physical test object. Exemplary embodiments of the system may be used to render, for example, collective video feeds into a realistic virtual reality environment.

Exemplary embodiments of the system may have any combination of segments, including, for example, a viewer system segment, a sensor node segment, and a network segment. The viewer system segment may include the human to machine interface, such as a display system. The sensor node segment may include any combination of data collection nodes, system aster timing and/or synchronization, and processing and/or storage tasks local to the system. The network segment may include physical data traffic infrastructure including, for example, switches, routers, cabling, etc. In an exemplary embodiment, the system may include process piece in which the system is calibrated and initiated. Calibration may include setting and configuring sensor nodes and/or physical mapping of the sensor nodes to the facility hardware, data feeds, and observed object. Exemplary embodiments of the process piece may align sensor nodes such that baseline three dimensional (or other visualization from the viewer system segment) representation of the observed object is aligned.

DRAWINGS

DETAILED DESCRIPTION

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

System/Method Explanation—Visualization Based on Image Overlay

Exemplary embodiments may include Virtual Reality (VR) and Augmented Reality (AR) solutions that display and interact with complex, 3-D data sets while preserving precise temporal and spatial registration. Although display options are described herein in terms of virtual reality, other display options are also included herein, including, without limitation, flat screen approximations of the three dimensional rendering viewable in augmented reality. Exemplary embodiments may include devices for receiving data including, for example, ruggedized imaging systems, temperature sensing, optical imaging in various wavelengths, electrical sensor, mechanical sensors, and combinations thereof. Exemplary embodiments described herein may be hardware-agnostic and not tied to a specific VR or AR product and/or brand, allowing the customer to leverage appropriate VR/AR technology evolutions as they materialize.

Exemplary embodiments include a system of receiving data about a test object. Exemplary embodiments are configured to superimpose the received data onto a three dimensional virtual object, where the three dimensional virtual object is a representation of the physical test object.

Figure 1A:
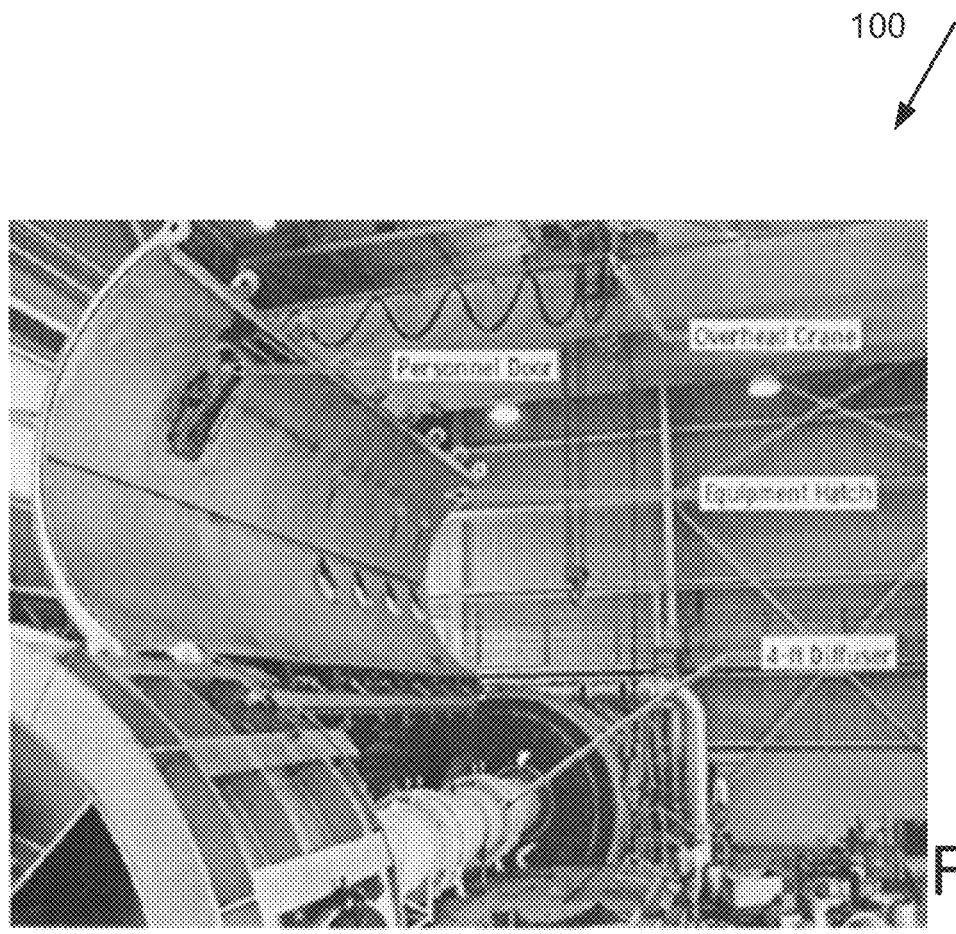
FIGS. 1A-1B illustrate exemplary test cell environments and objects.
Figure 1B:
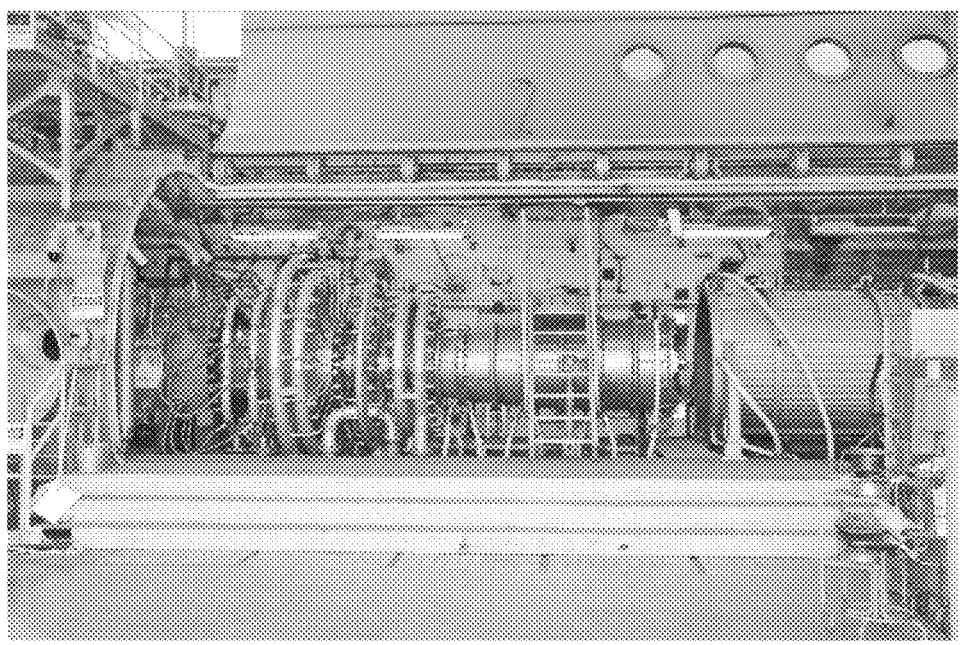

FIGS. 1A-1B illustrate exemplary representations of a test cell and test object for observation according to system and methods described herein. As shown, the test object includes complicated system of components. To observe the object under test, a number of cameras and sensors may be positioned around the test object. Conventionally, each feed may be observed and/or recorded individually. A user thereafter observes the various individual feeds. Although one or more feeds may be visually present and visible to a user (such as a user displaying two separate video feeds simultaneously), there is conventionally not a convenient way to integrate the information for a better or complete understanding of the test object.

Figure 2:
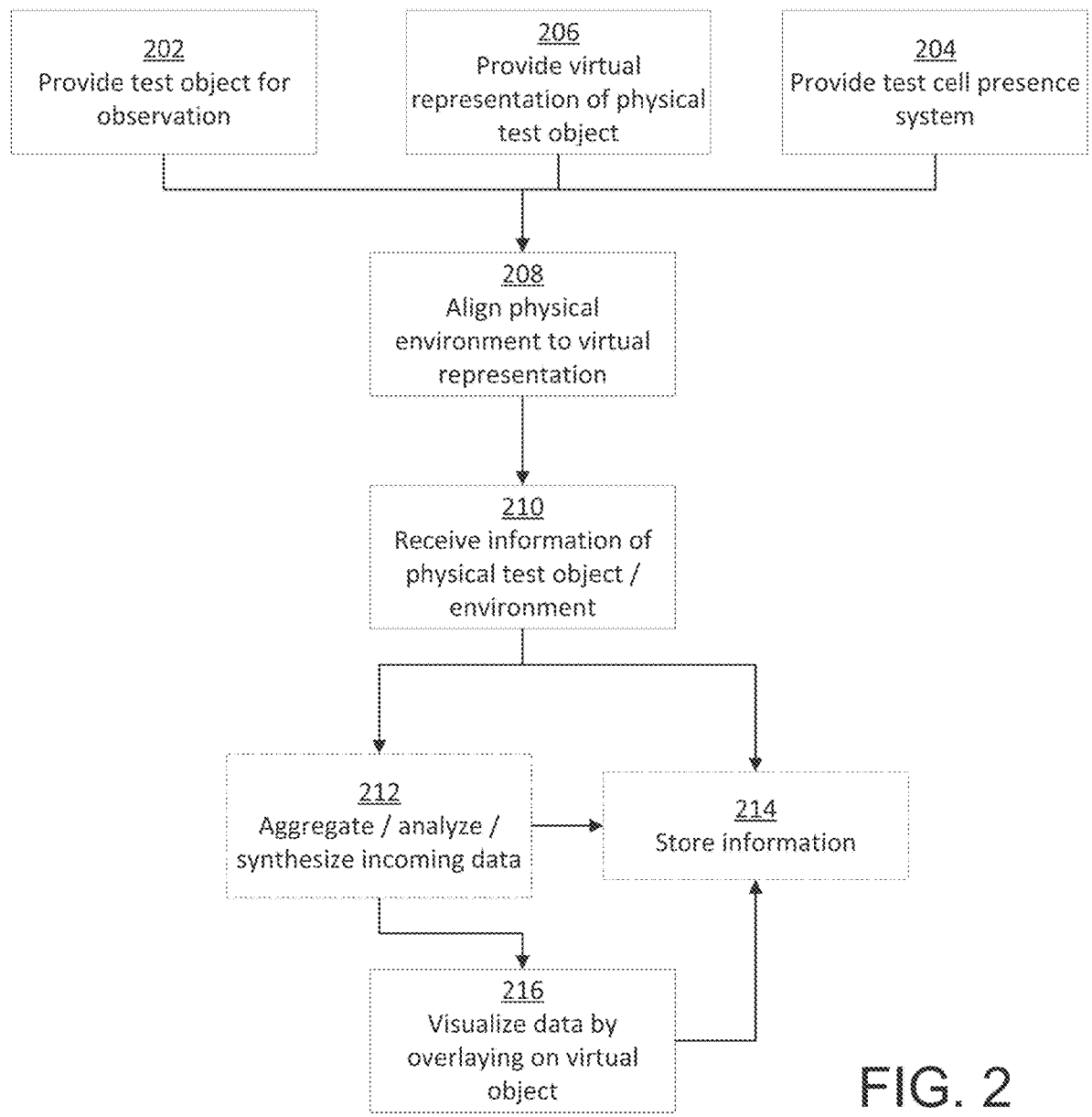
FIG. 2 illustrates an exemplary method according to embodiments described herein.

Exemplary embodiments described herein provide a test cell presence system and methods for providing an integrated view of a test object including information from one or more sources. FIG. 2 illustrates a flow diagram for methods of visualizing data of a test cell by overlaying received data onto a virtual object corresponding to the physical test object. The exemplary method includes receiving information about the physical test object, providing a virtual object corresponding to the physical test object, receiving information from one or more sources, and overlaying the received information onto the virtual object to provide an integrated view of the test object.

As represented at step 202 of FIG. 2, an exemplary method according to embodiments described herein include providing a physical environment including a test object for observation. The physical test object may be any physical object for observation. Observation is intended to be inclusive of any test objective including visual observation as well as specific physical testing, such as run time testing or environmental testing. Run time and environmental testing may include operating a test object in different environments, including dynamic (changing) environments of temperature, pressure, humidity, vibration, acceleration, movement, etc. Observation may also include any observable attribute of an object, not necessarily limited to visual observations. For example, observations may be through sensed information, such as temperature, speed, object input (such as power, current, etc.), object output (such as exhaust, power, current, light, heat, etc.), and any combination thereof.

As represented at step 204, the exemplary method includes providing a test cell presence system according to embodiments described herein. The test cell presence system may include one or more data sources to observe the test object of step 202. As described above, the observations may be through any combination attributes. In an exemplary embodiment, the test cell presence system comprises one or more cameras. The exemplary cameras may be in one or more band widths, such as for visual observation in different spectrums, including without limitation, visual, infrared (IR), ultra violet (UV), or other frequency such as for night vision, heat detection, etc. The one or more data sources may be any combination of sensors. In an exemplary embodiment, the sensor may be, for example, IR, vibration, UV, visual, audial, temperature, speed, current, composition, etc.

At step 206, the method includes providing a virtual representation of the physical test object. In an exemplary embodiment, to create the overlay of the data onto the virtual object, exemplary embodiments may include creating an accurate three dimensional representation of the physical setup at the test unit including the object for observation and/or test hardware components. Exemplary embodiments may use modeling or other rendering to create a virtual representation of an exemplary physical environment including the test object. In an exemplary embodiment, test ready computer aided design (CAD) models may be used as a basis for the virtual object. Any method for creating a virtual representation of the physical environment and/or test object are within the scope of the instant application. For example, methods for generating a virtual representation from a physical object or environment may include laser scan photometric scan, or other detector, system, or method of generating a three dimensional rendering. Exemplary methods to create accurate three dimensional renders of the test object and/or test cell hardware may include any combination of steps, including, without limitation, CAD modeling of the object and/or component parts, object detection and rendering through one or more sensors, image recognition, and combinations thereof.

At step 208, the physical environment including the object for observation (test object) may be mapped to the virtual object. The system may therefore be calibrated and/or initialized such that the physical mapping of the facility hardware, data feeds, and the observed object correspond to and properly align when overlaid onto the virtual representation. In this step, the system components may be positioned in a known location and orientation relative to the physical test object such that data received from the system components may be overlaid onto the virtual representation of physical test object. Other calibration systems and methods may also be used. For example, manual alignment may be used to align the visual feedback to the overlaid virtual object. The manual alignment may be performed in physical positioning of the sensors and camera, in electronic or software manipulation of the alignment of the overlay to the virtual objects and combinations thereof. In an exemplary embodiment, the system may be automated to detected a position of the sensors and determine a corresponding alignment for the sensor feed for overlaying on the virtual representation. For example, image recognition techniques may be used to identify a position on a camera feed to correspond with a position on the virtual representation. In an exemplary embodiment, the system may integrate one or more sensors into a data feed such that the data feed is in a predetermined location relative to a sensor for determining its position relative to the test object or other known environmental position. The data feed may therefore be able to self-locate and its data feed overlaid on the virtual object automatically. Exemplary embodiments may include combinations of automatic and manual calibrations. For example, the system may be manually calibrated to a set up orientation. However, during a test procedure or observation sensors may be permitted to move, rotated, or otherwise reposition. The repositioning of the sensors may be performed through command signals to mechanical/electrical components such that the repositioning is by a known amount. The system may thereafter automatically recalibrate based on the known changes to the system configuration. The system may also initially automatically calibrate, but may permit manual adjustments to improve or correct automatic determinations.

As represented by step 210, the method includes receiving information regarding the physical test environment, including, for example, the physical test object. The system may be configured to receive information from any of the described data sources or other source. Information may come from data of the one or more data sources, including cameras, sensors, etc. The information may come from sensed data, analyzed data, received data, etc.

At step 212, the method may include manipulating the received data in some way. The system may be configured to aggregate the data sources for representation on the virtual object. The system may aggregate the data sources by aligning the data sources. For example, the data may be aggregated by synchronizing the feeds in time. The data may be aggregated by aligning the data relative to a corresponding relative physical location. For example, data may be overlaid, duplicated, filtered, and combinations thereof for portions of data sources that overlap. In an exemplary embodiment, one or more data sources may provide a panoramic view of a test object, but may include overlapping areas between data sources. Aggregating the information may include aligning the feeds, and filtering overlapping data. Filtering may be by averaging information, removing information, etc.

Exemplary embodiments may also include the addition of dynamic data sources. For example, a user input through the user interface may generate data that can be appended to a data source or data stream or visual representation or recreation. For example, a user may look at the virtual representation using the user interface as described herein. The user may provide an input to the system, such as through an electronic controller (for example, a button push or movement queue). The user input may provide a tag or other input to the system that can be stored with the data for recreation or review in real time or replay. The tag may permit a user to enter in additional information, such as notes, or observation queues, or may simply identify points of observation to permit searching, or other data manipulation at a later time.

The system may perform other data analysis or synthesis. For example, the system may be configured to reduce a fidelity of one or more data sources to improve band width transmission. Fidelity may be reduced based on level of observation. For example, the lower fidelity (less data) may correspond to more distant points of view or larger areas of observation, while a higher fidelity (more data) may be provided for more specific areas of observation. The system may be configured to identify or receive areas of interest in which higher areas of fidelity are desired, which also indicates lower areas of fidelity. The fidelity may also be set based on received information, historical information, rates of change, etc. If the received information is within normal tolerances or a set tolerance, or within a given rate of change relative to a historical value, the system may reduce the fidelity as the received information. If the received information is changing, close to or within a range of observation, or other criteria, the system may be configured to receive or capture a higher fidelity. Fidelity may be, for example, a sampling rate of a given sensor or density of information such as in higher resolution. Exemplary embodiments may also perform analysis of one or more data sources or feeds for event detection. The system may be configured to adjust a fidelity of information based on the detection of an adverse or known event or other system criteria.

At step 214, the method may include storing the information. The system may be configured to store any combination of information. For example, the system may store the raw data feeds from the one or more data sources. The system may store the aggregated data sources. The system may store any analyzed, synthesized, or any combination of manipulated data. The system may also store the visualization of step 216.

Exemplary embodiments of the system may be used to render, for example, collective video feeds into a realistic virtual reality environment. The method, at step 216, may include rendering information onto the virtual representation of the physical test object. The visualization may be through any digital interface, such as a monitor, screen, virtual reality display, augmented reality display, etc. The visualization may be through augmented reality and/or virtual reality (referred to collectively herein as digital reality). In this instance, the virtual representation of the physical test object may be rendered and displayed in three dimensions. The information corresponding to the physical environment may be overlaid onto the virtual representation such that the received information is depicted visually directly over, onto, or proximate the virtual object. The user may therefore receive an approximation of the test object during the observation as if observing directly. The representation and/or overlay may alter the visual of the representation for the viewer such that it is not the same as a direct observation of a physical object. This may be, for example when a temperature or camera detecting in a non-visual spectrum is used and overlaid such that the virtually rendered object with information overlaid thereon may be represented in color corresponding to temperature, similar to a three dimensional heat map.

Test Cell Presence System

Exemplary embodiments described herein include systems and methods for providing a virtual test cell presence system in which a test object may be observed. The observation may include additional information beyond (or in addition to) visual inspection, such as through different frequencies, temperature, or other sensor information, and/or may include remote inspection by a viewer removed from the test location or facility.

Figure 3:
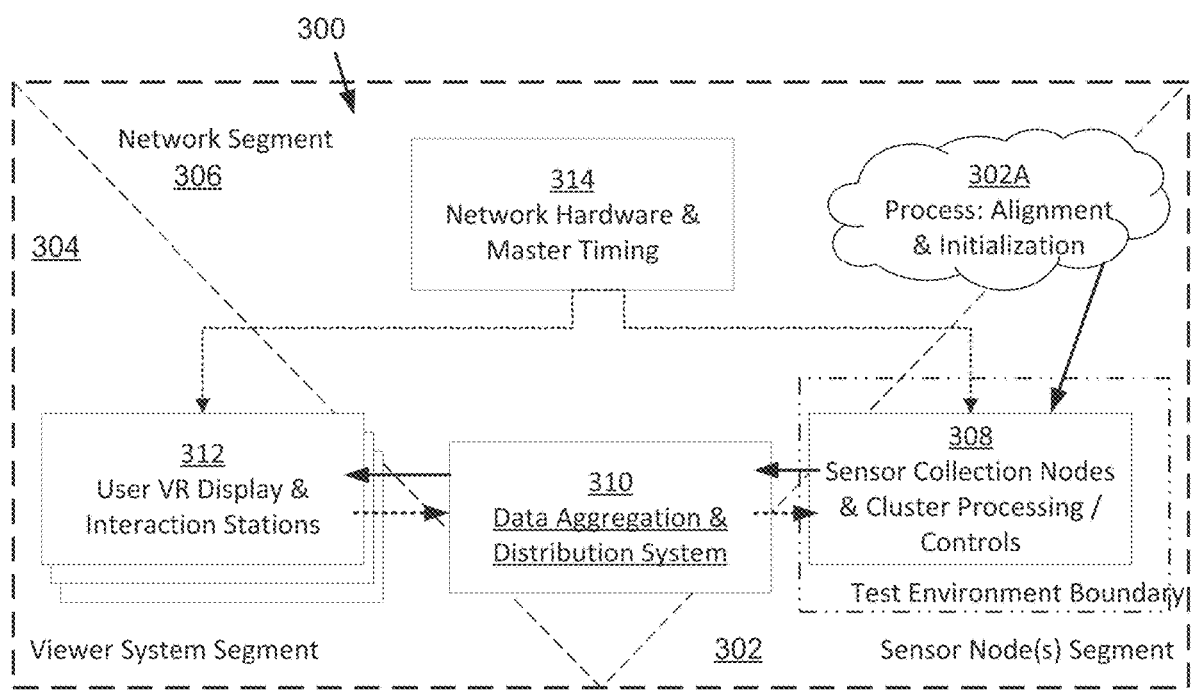
FIG. 3 illustrates an exemplary high level system diagram of a test cell presence system according to embodiments described herein.

FIG. 3 illustrates an exemplary block representation of a virtual test cell presence system according to embodiments described herein. Exemplary embodiments of a virtual test cell presence system 300 may include any combination of segments, including, without limitation, a view system segment 304, a sensor node segment 302, and a network segment 306. The method may also include a processing segment 302A. Exemplary embodiments are described herein in terms of different segments for example and explanation only. The system does not require any specific integration or segregation of segments. For example, any combination of components may be used as would be apparent to a person of skill in the art.

View System Segment

In an exemplary embodiment, the view system segment may include a user interface for displaying the results described herein. The view system segment 304 may include any combination of displays, including interaction stations 312 that permit user input and machine output including any digital display (augmented reality, virtual reality, 2-D screen, hologram, etc.). The user interface may be through a display or human machine interface. An exemplary embodiment of the display includes a virtual reality or augmented reality display/user interface. Other user interfaces may include digital displays such as 2-D screens, projectors, holograms, or other visual display system. Exemplary embodiments of the system are configured to display a virtual rendering of the test object with or without an environment around the test object. The system is configured to display virtual representations of information about the test environment including the test object overlaid onto, positioned adjacent, or otherwise in relation to the virtual rendering of the test object. In an exemplary embodiment, the representations of information is a camera feed conformed about the virtual rendering of the test object such that the display of the representation of information with the virtual object is a recreated three dimensional view corresponding to the physical test object under observation as seen by one or more sensors, including one or more cameras. Other information may be overlaid or displayed on the virtual rendering of the test object, such as, for example, color coded areas, call outs, text, or other display of information in relation to the virtual rendering of the test object corresponding to the information of the physical object.

Sensor Node Segment

The sensor node segment 302 of the system 300 may include any combination of sensors, controls, processing, or other components 308 for collecting the information for display. An exemplary embodiment of the sensor node segment is configured to receive data from the test environment and/or test object. The nodes may include any sensor, such as a camera, thermal detector, etc. The sensor node segment may also include components for system master timing and/or synchronization, one or more processors, and one or more memory for storing tasks and/or data associated with the system, and/or controlling the one or more sensors or other sensor node segment components. In an exemplary embodiment, the sensor node segment or one or more components of the sensor node segment may be positioned within the test environment boundary. The test environment boundary may segregate the test environment from a remainder of the environment and/or one or more users. The test environment boundary may be used to contain a test environment, such that temperature, pressure, humidity, and other environment factors may be controls, as well as contain chemicals, exhaust, heat, or other hazardous or unhealthy conditions from human observers.

In an exemplary embodiment of methods using embodiments of the virtual test cell presence system, the system 300 may be calibrated in a processing segment 302A. For example, the processing segment 302A may include the calibration of sensor nodes from the sensor nodes segment 302, including illumination and camera performance parameters, and physical mapping of sensor nodes to the test object and/or facility hardware and data feeds. The alignment of sensor nodes baselines the 3D visualization and may complete the system initialization. As described herein, the calibration of the virtual test cell presence system may be manual, automated or a combination thereof.

Network Segment

The network segment 306 may include one or more components such as network hardware, timing, communication, etc. 314. An exemplary embodiment of the network segment includes methods and components for communication between different components of the system and/or to or from the test environment. For example, the physical data traffic infrastructure including switches, routers, and cabling that connects the system components.

System Architecture

Figure 4:
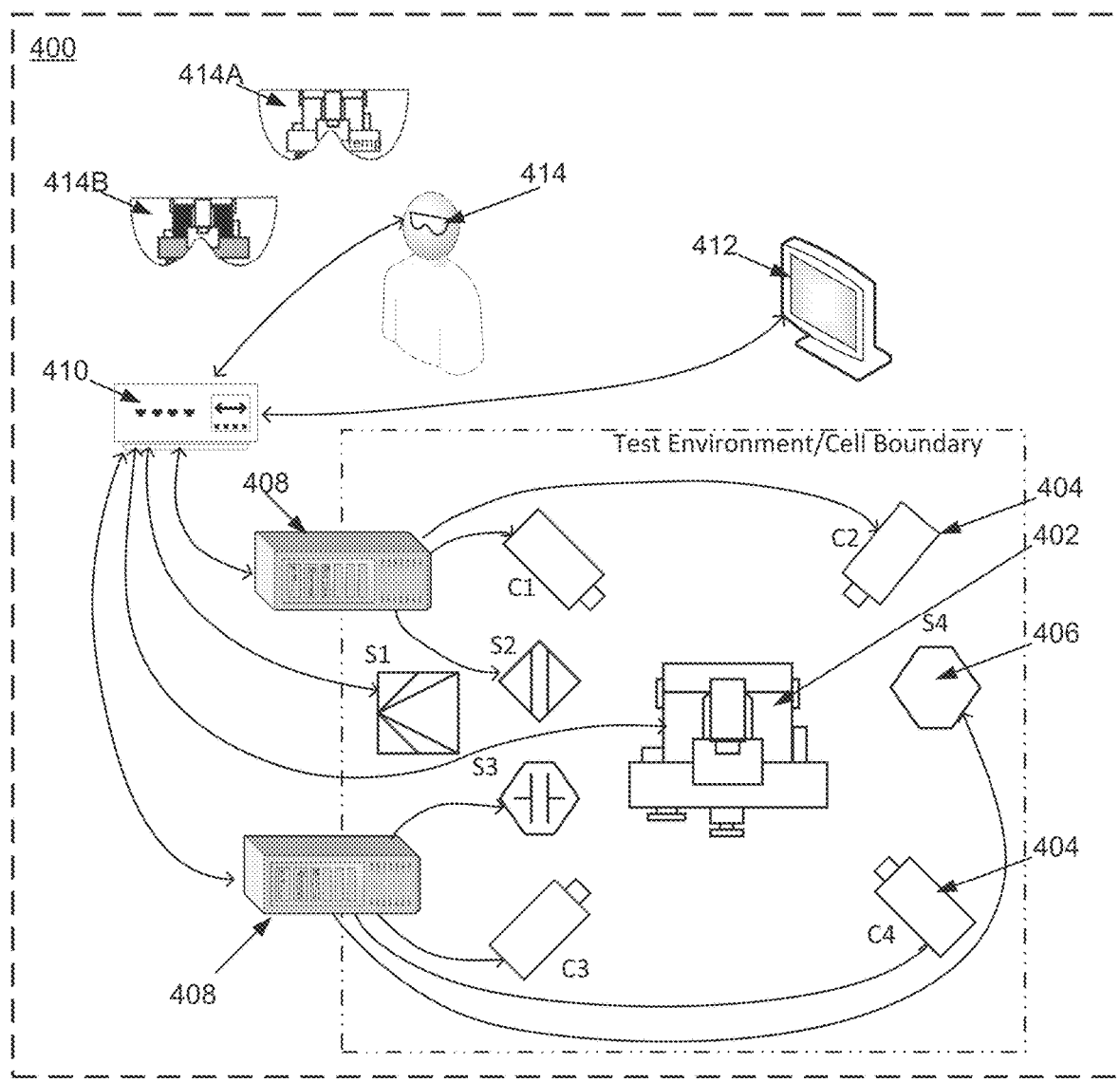
FIG. 4 illustrates an exemplary component system diagram of a test cell presence system according to embodiments described herein.

FIG. 4 illustrates an exemplary test system architecture according to embodiments described herein for the test cell presence system.

The test cell presence system 400 includes a location for the test object 402. The test object 402 is any physical object for observation and testing in the test environment. The test environment is defined by the test environment boundary. As described herein, the test environment boundary permits the delineation, separation, and/or control of the test environment including the test object. The test environment boundary may be sealed, such as to control pressure environments, may be sealed and/or vented to contain hazardous materials, or may include other structures, components, and features as the test environment dictates for performing the desired test on the test object.

Exemplary embodiments include sensors 406 and control systems 408 within the test environment for receiving and transmitting data about the test object 402. The sensors may be any combination of data receiving inputs, such as different video-source sensors 404 utilized to provide video coverage across different wavebands. Any combination of sensor types, quantities, qualities, locations, etc. may be used within the scope of the present disclosure. Different sensors and cameras are illustrated in FIG. 4 as cameras C1-C4 and sensors S1-S4. As used herein a camera is a type of sensor. Sensor hardware may be based upon a specific test environment and designed or configured for specific imaging requirements and may vary by installation or test. Exemplary control systems 408 may be ruggedized depending on the local test unit environment and hardware used for the command/control unit. The system may provide other components based on the test environment, such as, for example shock isolation. The control system 408 may manage video traffic and providing accurate timing across sensor nodes. The control system 408 may be positioned based upon cable lengths, and environmental considerations. The control system 408 may include memory to provide local data storage.

Exemplary embodiments of the test cell presence system 400 may include a data aggregation hub 410. The data aggregation hub may include one or more processor and one or more memory and other components for managing the synchronization, video routing, command traffic, or other features of the network segment described herein. The aggregation hub 410 may receive the data feeds from the sensors within the test environment. The data aggregation hub 410 may also be configured to perform any of the data aggregation, analysis, filtering, synthesizing or other modification of the raw data from the sensors from the test environment. The data aggregation hub may be proximate the test environment or may be remote therefrom.

Exemplary embodiments of the system may include a viewer system segment including user visual displays. Any 2-D screen 412 or user display device may also be used.

Alternatively, or in addition thereto, any digital (either virtual, augmented, or holographic) reality system 414 may be used. In an exemplary embodiment, the digital reality display may use "inside-out" tracking with all tracking hardware present on a headset. Other tracking and control inputs may also be used. For example, a controller, such as a handheld remote may be used. The exemplary tracking and control components may be used to alter the view of the digital reality by changing perspective, zooming, changing display information/inputs, or combinations thereof. Exemplary embodiments may reduce the connections needed between the headset and the rest of the system.

Exemplary Displays

FIG. 4 illustrates exemplary virtual representations of a test object as viewed through a digital display 414A, 414B, 412 according to embodiments described herein. The exemplary representations of the virtual reality displays 414A, 414B illustrate the same object with different information overlaid on the virtual object to provide examples of how information can be provided to a user through a three dimensional virtual representation of the test object.

Figure 5A:
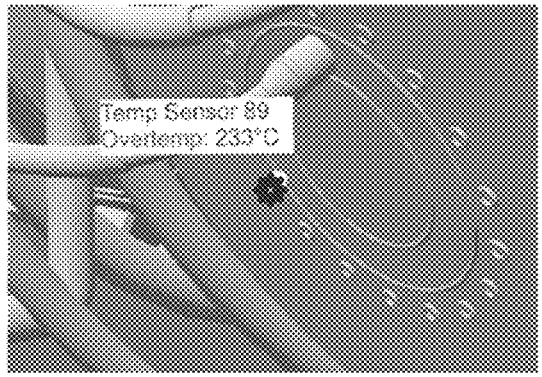
FIGS. 5A-5D illustrate exemplary visualizations from the test cell presence system according to embodiments described herein.
Figure 5B:
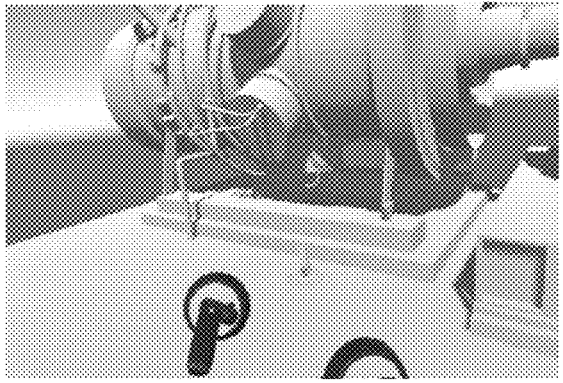

FIG. 5A-5D illustrate an exemplary display options in which information is display to a user in combination with the virtual representation of the test object. In an exemplary embodiment, non-imaging data may be provided with the virtual representation of the test object on a display as a pop up. Exemplary embodiments of the system and method are configured to receive different sources and types of data. The received data may not include visual or imaging data that can be grafted onto the shape or virtual model of the test object for a direct overlay of the data onto the virtual representation of the test object. However, this non-conforming information may be displayed in other ways. As illustrated in FIGS. 5A-5D, the information may display on a pop up or information display window displaying the data approximate to or with a virtual object indicating the source of the information. Other display options may also be used, such as providing other virtual object overlays. For example, color coding or symbol corresponding or representing the displayed data may be used as an overlay of the virtual representation of the physical test object. As illustrated in FIG. 5A, if a temperature sensor is determined to be out of range, the location of the temperature sensor on the virtual representation of the test object may change color or a symbol (illustrated as a star in FIG. 5A) may be used to draw attention to that location of the virtual representation of the test object. Different temperature color codes may be used to correspond to or indicate different things, such as in range, out of range, high, low, or approximate temperature range, etc. Also as illustrated in FIG. 5A, text information or other information from a data source may be provided as an overlay positioned in proximity to the virtual representation of the test object corresponding to the source of data represented in the overlay. As illustrated the temperature associated with the symbol displayed on the virtual representation is displayed to a user.

Figure 5C:
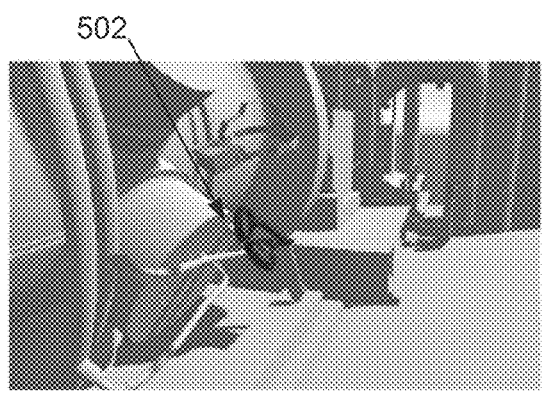
Figure 5D:
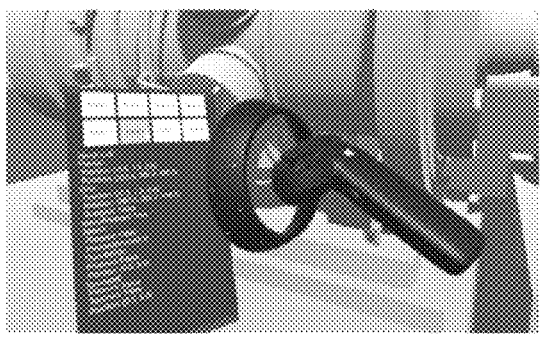

FIGS. 5A-5D illustrate exemplary demonstrations of a rendered sample virtual environment to demonstrate the notional system user experience. Temperature sensors and other non-imaging data sources could display their status via colored or symbolic indicators on the VR model (FIG. 5A). Detailed information may appear when the data feed node is "looked at" by the user. Navigation in the virtual environment may control, engage, interact with, and/or view different portions of the system. For example, the system may be configured to detect head movements, which may be used to control the short distance travel and precision positioning of the virtual display environment. Exemplary embodiments may also include hand controllers or other inputs that may be used to trigger long distance movement within the virtual display environment. For example, the system may include a hand held controller that may include a joy stick, buttons, toggle, or other controller(s). In an exemplary embodiment, the user may select to "move to" a given target via the thumb-stick command or other input. Left, or right movement of the thumb-stick may be used to adjust the view's rotation, while reverse movements may be activated by pushing backwards on the thumb-stick. Exemplary embodiments, may suspend or otherwise manipulate the display of the virtual environment, such as through fade in/out, blinking, screen freeze, or other transition to minimize user disorientation during teleporting or rotation from one view or viewing area of the virtual environment to another. As a navigation aid, the system may be configured to receive or define locations for rapid repositioning. The hand controller may superimpose representative user interface controls and information display as illustrated herein. The interface (as illustrated in FIG. 5D) may be normally hidden within the virtual display environment and may be called up via an input, such as a menu button or head motion input, and then operated with a controller, input, or gesture recognition.

Exemplary embodiments described herein include different implementations for the system, ranging from a simple distribution of a small number of cameras that are approximately located in a less-than-detailed three dimensional model to a high-fidelity rendering of the test object with live video feeds from numerous precisely aligned and calibrated cameras draped seamlessly onto an accurate three dimensional model of the test object.

Exemplary embodiments permit the operator(s) to set up fixed "virtual" display feeds that deliver information to a standard two dimensional display. This enables other personnel to view selected imagery feeds without virtual reality. The system may be used to render the user's virtual reality point of view to a two dimensional display, and/or permit the user of the two dimensional display to rotate or navigate the virtual object through the two dimensional interface. The two-dimensional display may also provide information about the three dimensional user perspective. As seen in FIG. 5C, an exemplary virtual representation of the test object may be displayed with the perspective position of the viewer through a virtual reality or other three dimensional display system is indicated to represent the focus, perspective, and view of the three dimensional viewer to the two dimensional viewer. As illustrated, the headset/lenses 502 of the three dimensional viewer are represented on the virtual representation of the test environment to indicate position and direction of the three dimensional viewer.

Exemplary embodiments may permit multiple users to engage with the system simultaneously through any combination of user interface alternatives described herein. For example, one or more users may experience the digital reality as well as one or more other users may experience through two-dimensional displays or even single dimension data feeds. The system may be configured to permit users to control and interact through the user interface either independently, such that each user can manipulate their personal view and receiving corresponding data feeds, or collaboratively such that views may be shared or manipulated collectively, or any combination thereof.

Figure 6:
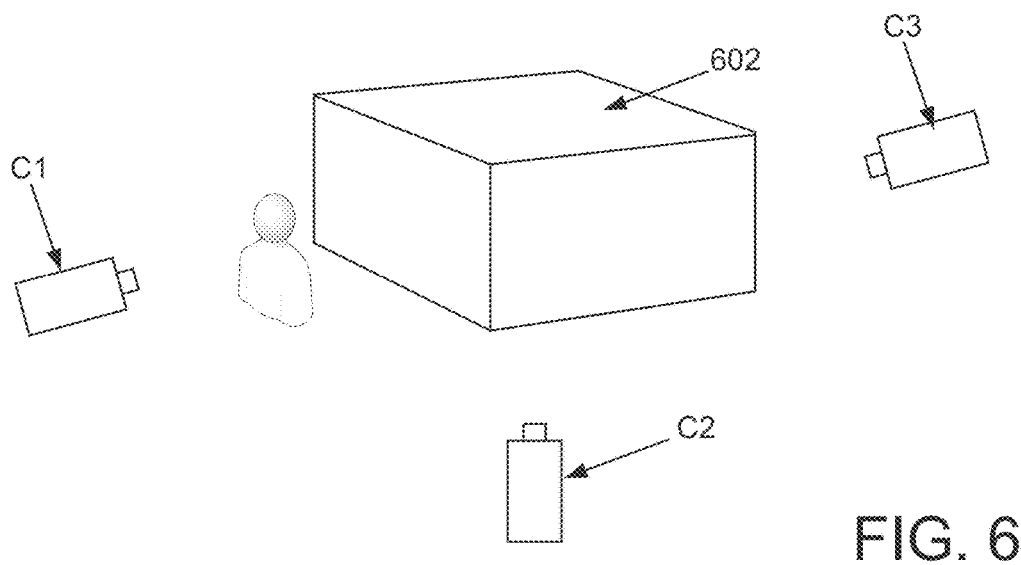
FIG. 6 illustrates an exemplary test environment to illustrate the methods visualization according to embodiments described herein.
Figure 7A:
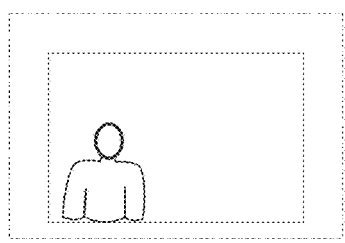
FIGS. 7A-7C illustrate exemplary data feeds from the test environment of FIG. 6.
Figure 7B:
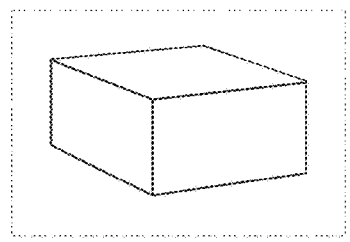
Figure 7C:
Figure 8:
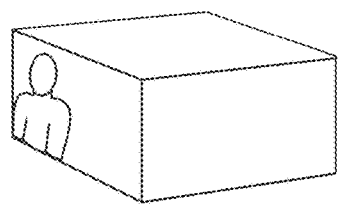
FIG. 8 illustrates an exemplary virtual representation of the test environment of FIG. 6 for visualization in three dimensions according to embodiments described herein.

FIGS. 6-8 illustrates an exemplary system reconstruction to illustrate the system and concepts described herein. A box 602 is chosen as a test object for observation. The box is virtually modeled and a three dimensional mesh model is used to render the video feeds from three camera sources C1, C2, C3 onto the virtual representation of the physical object. As illustrated in FIG. 6, the test environment includes the target object 602 under observation and three cameras C1, C2, C3. As illustrated, a bust figuring is used to illustrate an imaging obstruction in one camera feed, C1. Therefore, since the system has no knowledge that the figure is an obstruction, the system renders the bust onto the model. FIG. 7A illustrates the image received from camera C1; FIG. 7B illustrates the camera feed from camera C2; and FIG. 7C illustrates the feed from camera C3. As illustrated, the bust figure appears in the image of camera C1 in front of the target object 602. FIG. 8 illustrates the virtual representation of the physical object with the information from the camera feeds superimposed onto the virtual model. As illustrated, the image of the bust is integrated onto the side of the virtual representation of the cube as the system is unaware that the feed is obstructed and does not correspond to the model representing the physical object.

In an exemplary embodiment, the system may include depth sensors as one or more components of the test cell presence system. The depth sensors may be used to generate the three dimensional mesh or structure for modeling the virtual representation of the physical environment. An exemplary, therefore, may include a system and method of providing or receiving depth sensor outputs for use in an exemplary embodiment to create a three dimensional mesh for use in the virtual object overlay. In an exemplary embodiment, a three dimensional rendering method may include the user of a depth sensor, either in combination or separate from the camera or video feed. In an exemplary embodiment, a combined color camera depth sensor is used. Exemplary embodiments can be used to create a three dimensional mesh for the perspective of the camera.

Exemplary embodiments may be configured to resolve small objects (for example, ~0.05 inches or less). Exemplary embodiments of the system and methods described herein may allow the user to "walk around" in digital reality and monitor critical joints, items and connection points. The system may deliver multi-spectral sensing capability (visible and infrared wavebands, as examples) with continuous, real-time 3D video feeds. The system architecture may support integration of active viewing of other test cell data sources (temperatures, pressures, data feeds, etc.). As a system, exemplary embodiments permit faster visualization and a more comprehensive understanding of the operational test cell environment, helping detect minor issues before they grow into major problems.

Exemplary embodiments may include system architectures that may consider both the large amounts of real-time data required for rendering the test cell presence into virtual or augmented reality and the practical limitations of today's state-of-the-art computers. Exemplary embodiments of a virtual test cell presence system implementation may include sensible camera selection, appropriate network design, intelligent bandwidth management, and practical considerations about the test unit coverage requirements. Large-scale, high-resolution viewing of the test unit may include a form of video compression, or a method for video feed switching implemented as a "Level of Detail" viewing capability. "Level of Detail" may automatically (or manually) reduce the resolution of the camera field into digital reality or for display depending on the virtual distance between the viewer and camera and actual resolution of the display. "Level of Detail" may adjust the resolution or other fidelity (sampling rate, etc.) displayed in digital reality or other display methods depending on a virtual distance between a virtual viewing perspective and the virtual representation of the test object. For example, if a user through the digital reality interface moves closer to the virtual representation of the test object, the fidelity or resolution of the display may increase, while the fidelity or resolution may be reduced as the viewer digitally moves further away from the virtual representation of the test object.

These methods may be incorporated to preserve transmission bandwidth.

Exemplary embodiments may use any combination of hundreds of potential cameras. Any combination of cameras, sensors, and data sources may be used in any combination. Therefore, there may be a single camera or any number of multiple cameras, sensors, or other data feeds or sources. The cameras vary by waveband, image type, focal plane size, pixel pitch, frame rate, data output format, interface, environmental performance range, and other parameters. In an exemplary embodiment, the system includes hard-mounted sensors with fixed focal length lenses. The fixed location and focal length of the cameras may provide for easier calibration and mesh overlay of the received data on the rendered virtual object. The system may also use variable locations and/or focal lengths in which the system may be manually or automatically recalibrated according to embodiments described herein. In an exemplary embodiment, highly stabilized and steerable custom imaging systems may be used that provide accurate and repeatable positioning.

Calibration of exemplary embodiments described herein may include white balance, and other performance parameters. Calibration may include the physical three dimensional mapping of the test unit and the relative alignment of the senor nodes to the three dimensional map. A calibration process permits sensor node alignment and permits the proper generation of three dimensional imagery from the two dimensional video feeds. Calibration may be used to establish various intrinsic and extrinsic parameters of the respective sensor nodes and may record them as part of an initialization process. Intrinsic parameters (lens focal length, camera pixel pitch, etc.) remain fixed throughout the lifetime of the sensor node, while extensive parameters such as sensor node position and orientation may vary due to operational needs. The use of fixed system reference points and rigid mounting techniques helps minimize recalibration burdens.

In an exemplary embodiment, the system may also include dynamic or controllable intrinsic parameters, such as camera position, orientation, focal length, etc. The system may be configured to detect a change in a dynamic intrinsic parameter and recalibrate the system accordingly. The recalibration may be automatic, manual, or a combination thereof. The system may also include one or more identification sensors to assist in calibration. For example, the system may detect or determine a location, use visual or other data recognition to relate a data stream to the virtual representation to permit calibration and data overlay to the virtual representation.

Figure 9:
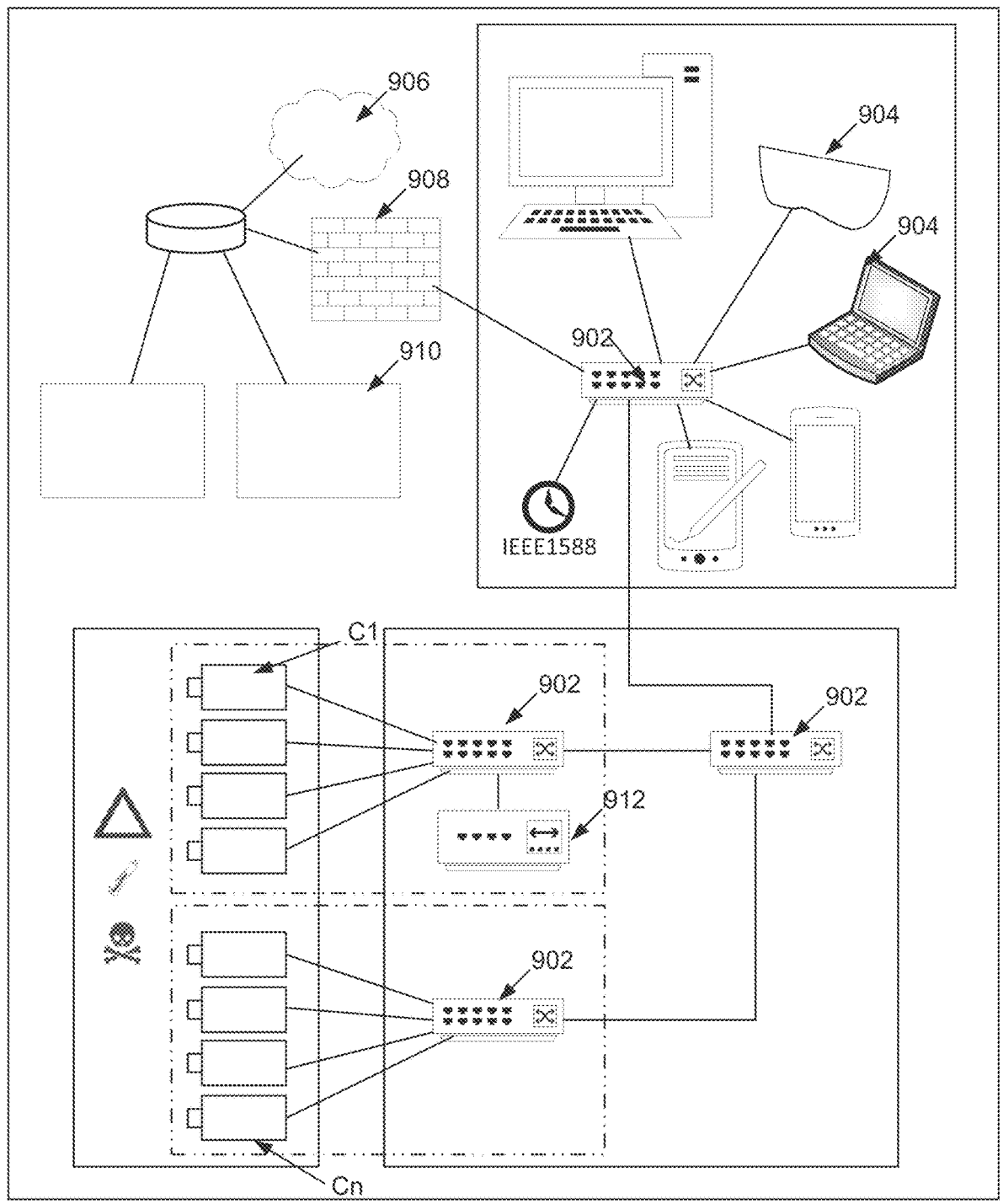
FIG. 9 illustrates an exemplary system architecture according to embodiments described herein.

Exemplary embodiments of the system including a multi-camera system can benefit from using a master timing device and master clock. Exemplary embodiments of a system architecture is illustrated in FIG. 9. The system may include any combination of switch controllers 902 coupled to any combination of cameras C1-Cn. One embodiment may use IEEE 1558 compliant cameras to simplify system level timing synchronization and synchronizing all computers, cameras, and networking equipment in a system. Other standards, protocols, components, methods, and combinations thereof may also be used for timing, synchronization, or amalgamating data. A master clock can aid in determining and fixing any sources of latency that may occur. The system may include any combination of data aggregation hub 912 or other analytics components as described herein. The system may include any combination of digital displays 904 for rendering the virtual object in conjunction with information from the one or more data sources. The system may be integrated into a conventional or previous system architecture 910 and protected through a fire wall 908 and have access to the system network or internet 906.

An exemplary network may include a physical topology that supports future increases in camera count and capability. The transfer of video from cameras to optional local data storage nodes may also be used to minimize sharing of links and allows direct calculation of the bandwidth and storage capacity requirements. Long-haul links, such as those between the test area and display area, may use fiber. Remaining links may be copper, unless greater resolution is required.

Exemplary embodiments of system components of the system network may include managed equipment, in that they have a dedicated management interface and maintain operational statistics. This visibility into network behavior may be used to verify the configurations and expected results against real system operations.

Exemplary embodiments seek to minimize unmonitored choke points in which excessive flows of video data converge. The network structure may be used to increase flexibility in resource allocation and can expand to incorporate additional cameras and storage nodes on an as-needed basis.

Exemplary embodiments may use various configurations of video compression or various compression techniques such as H.264, H.265, JPG, and JPG2000. These compression methods could reduce the amount of bandwidth required by the network but introduce latency and require some form of processing power and may also reduce overall image fidelity.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Although embodiments of this invention have been described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A method of providing three-dimensional test cell visualization, comprising:
   providing a physical environment including a test object;
   providing a virtual test object corresponding to the test object in the physical test cell by generating a computer aided design model of the test object;
   receiving information related to the test object through one or more digital feeds from one or more cameras;
   mapping a portion of the information on the virtual representation by overlaying a first portion one or more digital feeds from the one or more cameras over at least a portion of the virtual representation of the test object; and
   displaying a first view of the virtual representation of the test object with the overlaid portion of the information;
   receiving a user input indicating a change in a perspective view of the virtual test object;
   mapping another portion of the information on the virtual representation by overlaying one or more digital feeds from the one or more cameras over at least another portion of the virtual representation of the test object corresponding to the change in perspective view of the virtual test object; and
   displaying a second view of the virtual representation of the test object with the virtual representation of the test object with the overlaid another portion of the information.

2. The method of claim 1, wherein the one or more cameras are the one or more sensors.

3. The method of claim 1, further comprising calibrating the physical test cell including the one or more sensors with the virtual representation of the test object.

4. The method of claim 3, further comprising manipulating the data stream by reducing a resolution based on a level of detail depending on a virtual distance between a virtual viewing perspective and the virtual representation of the test object.

5. The method of claim 4, further comprising receiving an input from a user.

6. The method of claim 3, wherein the providing the virtual representation is generated through a computer aided design model.

7. The method of claim 1, wherein the receiving information related to the test object comprises receiving information from a plurality of sensors related to the physical object and the information from the plurality of sensors is time synchronized.

8. The method of claim 7, further comprising combining the information from the plurality of sensors by aligning and filtering overlapping information from the information from the plurality of sensors to create amalgamated information and the visualizing the information on the virtual representation is the visualizing the amalgamated information on the virtual representation.

9. The method of claim 8, further comprising mapping the information from the plurality of sensors or the amalgamated information to the virtual representation, and using the mapping for the visualizing so that the amalgamated information is displayed in three dimensions aligned with and visually depicted onto the virtual representation of the physical object.

10. The method of claim 9, wherein the plurality of sensors comprises a plurality of cameras positioned around the physical object each providing a digital image feed of the physical object.

11. The method of claim 10, mapping the information from the plurality of sensors or the amalgamated information to the virtual representation comprises generating a three dimensional mesh to integrate the information from the plurality of sensors or the amalgamated information onto the virtual representation of the physical object.

12. The method of claim 11, further comprising manipulating the information from the plurality of sensors into the amalgamated information by reducing a resolution based on a level of detail depending on a virtual distance between a virtual viewing perspective and the virtual representation of the physical object.

13. The method of claim 1, wherein the mapping of the portion of the information corresponds to only information related to the first view of the virtual representation, and the mapping of the another portion of the information corresponds to only information related to the second view of the virtual representation.

14. The method of claim 1, further comprising receiving another user input indicating a change in virtual distance to the virtual representation; and using a different level of detail of the information mapped and displayed on the virtual representation.

15. The method of claim 1, further comprising saving the one or more digital feeds from one or more cameras.

\* \* \* \* \*